(12) United States Patent
Porikli

(10) Patent No.: US 7,483,572 B2
(45) Date of Patent: Jan. 27, 2009

(54) RECOVERING A NON-LINEAR WARPING FUNCTION FROM IMAGES

(75) Inventor: Fatih M. Porikli, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 821 days.

(21) Appl. No.: 10/925,818

(22) Filed: Aug. 25, 2004

(65) Prior Publication Data

US 2006/0044578 A1    Mar. 2, 2006

(51) Int. Cl.
- *G06K 9/62* (2006.01)
- *G06K 9/68* (2006.01)
- *G06K 9/36* (2006.01)
- *G06K 9/48* (2006.01)
- *G06F 15/00* (2006.01)
- *H04N 1/60* (2006.01)

(52) U.S. Cl. ............... 382/215; 382/218; 382/294; 382/241; 382/242; 382/243; 358/1.9; 358/3.26; 358/3.27

(58) Field of Classification Search ............... 382/294, 382/215
See application file for complete search history.

(56) References Cited

U.S. PATENT DOCUMENTS

| | | | | |
|---|---|---|---|---|
| 4,183,013 A * | 1/1980 | Agrawala et al. | ............ | 382/173 |
| 5,644,656 A * | 7/1997 | Akra et al. | ............ | 382/215 |
| 5,774,586 A * | 6/1998 | LeCun | ............ | 382/215 |
| 5,949,919 A * | 9/1999 | Chen | ............ | 382/276 |
| 5,978,030 A * | 11/1999 | Jung et al. | ............ | 375/240.16 |
| 6,006,015 A * | 12/1999 | Bender et al. | ............ | 358/1.18 |
| 6,037,988 A * | 3/2000 | Gu et al. | ............ | 375/240.16 |
| 6,052,481 A * | 4/2000 | Grajski et al. | ............ | 382/187 |
| 6,219,462 B1 * | 4/2001 | Anandan et al. | ............ | 382/294 |
| 6,330,358 B1 * | 12/2001 | Nagaishi | ............ | 382/178 |
| 6,526,173 B1 * | 2/2003 | Burns | ............ | 382/236 |
| 6,587,601 B1 * | 7/2003 | Hsu et al. | ............ | 382/294 |
| 6,597,818 B2 * | 7/2003 | Kumar et al. | ............ | 382/294 |
| 7,016,544 B2 * | 3/2006 | Boon | ............ | 382/233 |
| 7,324,104 B1 * | 1/2008 | Bitter et al. | ............ | 345/420 |
| 2003/0122815 A1 * | 7/2003 | Deering | ............ | 345/419 |
| 2004/0088722 A1 * | 5/2004 | Peker | ............ | 725/19 |
| 2005/0102107 A1 * | 5/2005 | Porikli | ............ | 702/20 |
| 2005/0249426 A1 * | 11/2005 | Badawy | ............ | 382/241 |
| 2006/0002472 A1 * | 1/2006 | Mehta et al. | ............ | 375/240.16 |

OTHER PUBLICATIONS

E. Levin and R. Pieraccini, Dynamic planar warping for opitcal character recognition, *Proceedings of ICASSP*, 149-152, 1992.

(Continued)

*Primary Examiner*—Brian Q Le
*Assistant Examiner*—Michelle Entezari
(74) *Attorney, Agent, or Firm*—Dirk Brinkman; Gene Vinokur

(57) ABSTRACT

A method determines a warping function between a first image and a second image. For each pixel in each scan-line of the first image, a distance matrix is constructed which represents distances between the pixel and a plurality of corresponding pixels of a second image. The distance matrices are ordered according a scan-line order of the pixels. A minimum cost path through the ordered distance matrices represents the warping function between the first image and the second images

17 Claims, 4 Drawing Sheets

203

202

201

RECOVERING A NON-LINEAR WARPING FUNCTION FROM IMAGES

FIELD OF THE INVENTION

The present invention relates generally to the field of image processing, and more particularity to recovering a warping function between images.

BACKGROUND OF THE INVENTION

Determining a warping function between two images is important for several applications. For instance, many projector systems require automatic recovery of the shape of a display surface. There, a known pattern is projected onto a surface having an unknown shape. An image of the pattern on the surface is compared with the known pattern to find the warping function, which manifests the shape of the surface. The warping function minimizes an error between the original and projected images.

Another application is to correct optical distortion of a camera. Distortion can be due to lens distortions, water drops on the lens, distorting glass in front of the lens, or atmospheric conditions.

A number of methods are known for recovering warping functions between images, see, e.g., Uchida et al., "Piecewise Linear Two-Dimensional Warping," Proceedings of the 15th ICPR, 3, pp. 538-541, 2000. However, that method is limited to linear distortions along a single direction.

Existing non-linear warping recovery methods are computationally demanding because those methods include a 2-D minimization problem, see, e.g., Levin et al., "Dynamic planar warping for optical character recognition," Proceedings of ICASSP, pp. 149-152, 1992.

Therefore, there is a need for a method that can determine a non-linear warping function between two images that does not have the problems of the prior art methods.

SUMMARY OF THE INVENTION

The invention provides a method for determining a warping function between a first image and a second image. For each pixel in a scan-line of a first image, a distance matrix is constructed which represents distances between the pixel and a plurality of corresponding pixels of the second image. The distance matrices are ordered according the scan-line. A minimum cost path through the ordered distance matrices represents the warping function between the first image and the second image.

DETAILED DESCRIPTION OF THE PREFERRED EMBODIMENT

Figure 1:
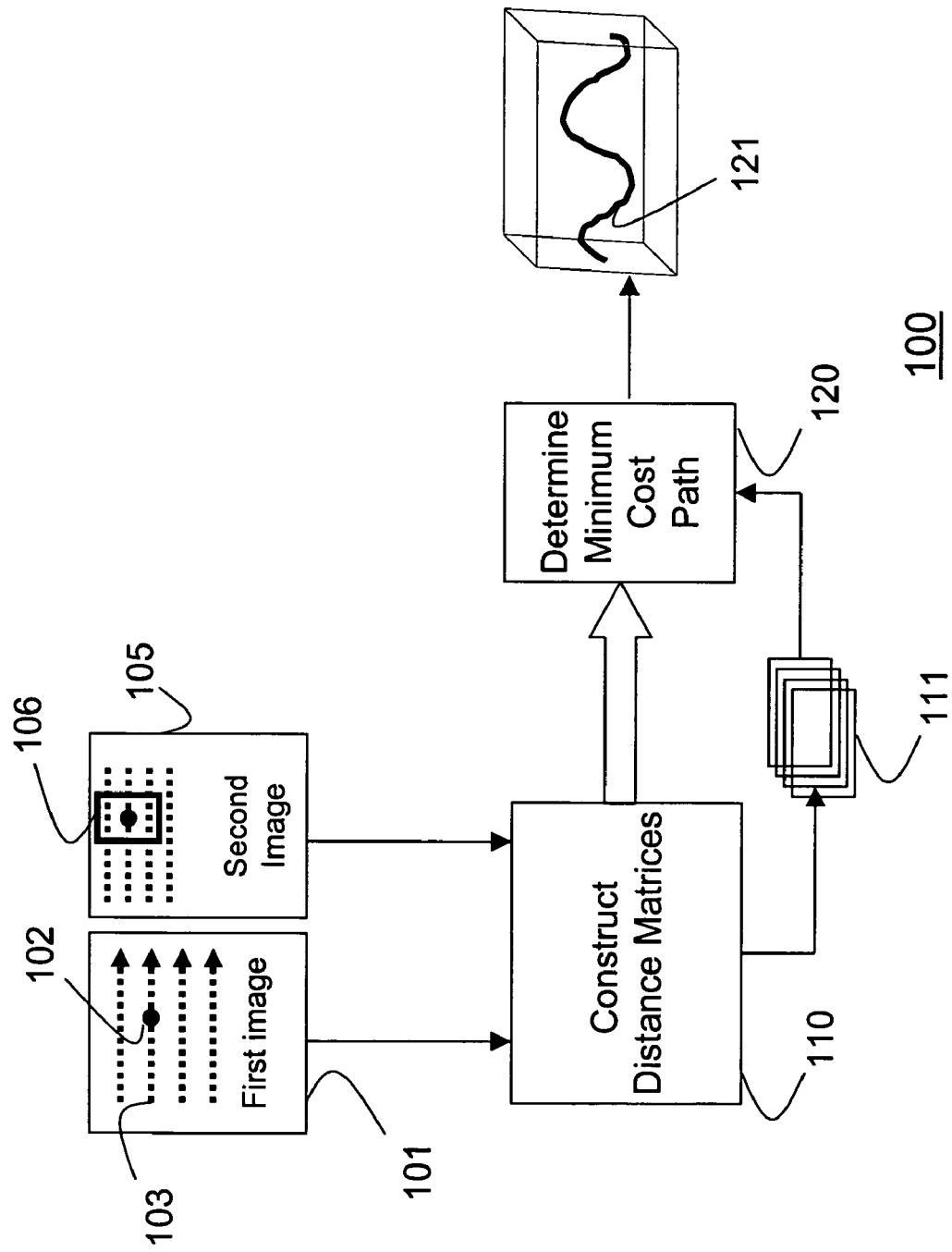
FIG. 1 is a flow diagram of a method for determining a warping function according to the invention.

As shown in FIG. 1, a method 100 for recovering a warping function according to my invention takes as input a first image 101 and a second image 105. A distance matrix 111 is constructed 110 for each pixel 102 in each scan-line 103 of the first image. Each distance matrix 111 represents distances between the pixel 102 and a block of corresponding pixels 106 of the second image. The distances measure how far the pixel 102 in the first image is displaced in the second image. A center of the block of pixels in the second image corresponds to a location of the pixel 102 in the first image. The matrices 111 are produced according to an order of the scan-line. A minimum cost path 121 is determined 120 through the ordered distance matrices 111. The minimum cost paths for all scan lines represent a warping function between the first image and the second image.

Scan-Line

Figure 2C:
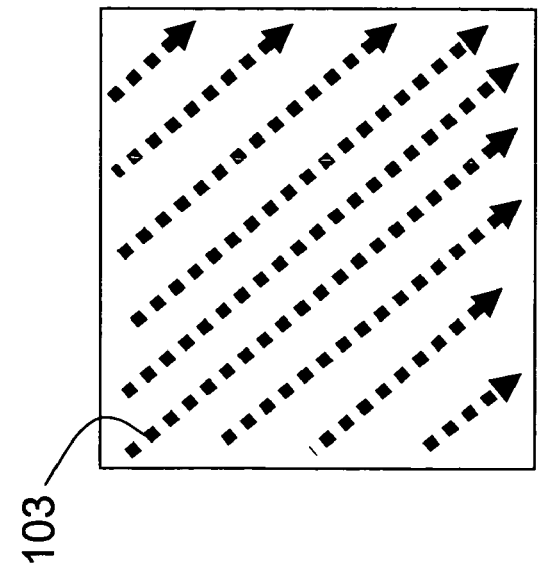
FIGS. 2A-2C are block diagrams of scan-lines according to the invention.
Figure 2B:
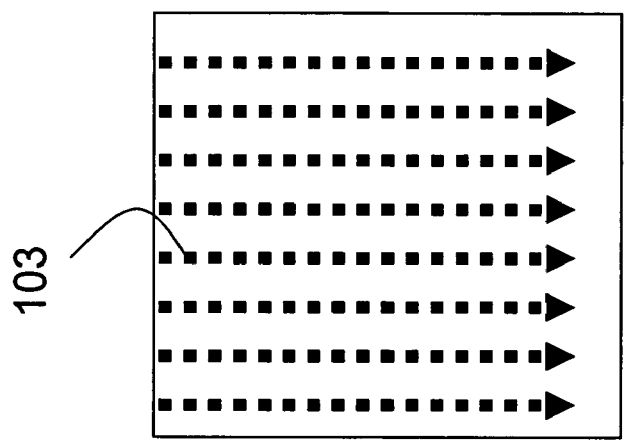
Figure 2A:
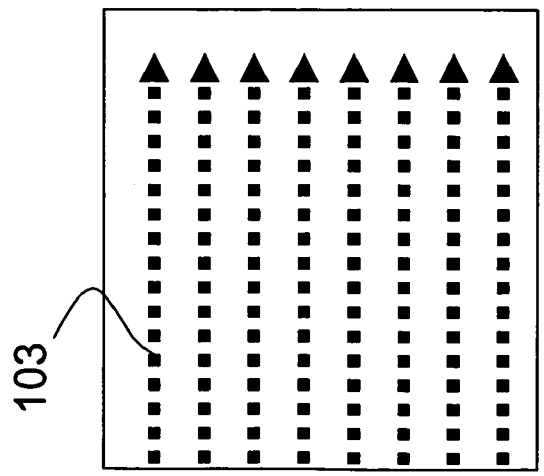

As shown in FIGS. 2A-2C, the scan-line 103 is a 1-D line in the first image 101. The scan-line can be a horizontal line 201, a vertical line 202, a diagonal line 203 of pixels. Each scan-line also has an associated order, e.g., left to right, or top to bottom. The scan-line can also be curved, such as an S-shape, a spiral, or a zig-zag pattern, as long as each pixel in the first image is included in one of the scan-lines. It should be noted that a single scan-line can also be used, as long as the line is continuous and covers all pixels.

In the preferred embodiment, I define the first image as $I(x, y)$ 101, and the second image as $I_w(x, y)$ where $x=1, \ldots, M$ and $y=1, \ldots, N$. A warping w between the first and second images is defined as $$I_w(x, y) = I(x+w_x(x, y), y+w_y(x, y)),$$

where the variables $w_x$ and $w_y$ represent the horizontal and vertical coordinates of pixel relocation due to warping, respectively. Thus, the warping function is a two-dimensional, real-valued mapping of the pixel coordinates.

For the pixel 102 on the scan-line $s_y(x)$ 103 of the first image, I determine the distances of all pixels 106 in the second image to construct 110 the distance matrix 111 for the pixel 102. The distances can be determined by comparing pixel color, intensity, gradient, or other well-known distance measures for pixels. The pixels 106 in the second image are preferably a block of pixels centered on a pixel in the second image 105 having the same coordinates of the pixel 102 of the first image 101.

Figure 3:
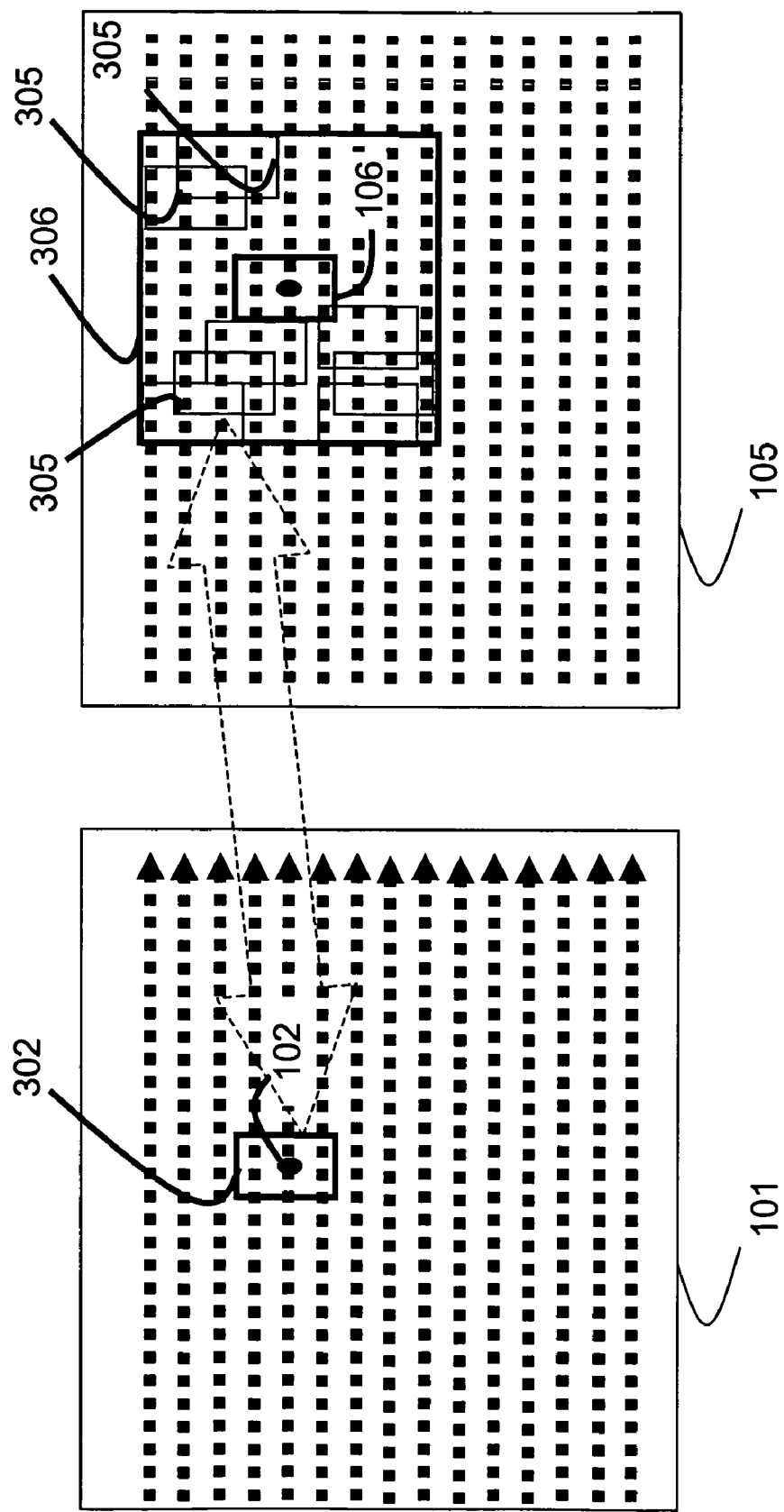
FIG. 3 is a block diagram of block matching in a search space according to the invention.

FIG. 3 shows a preferred embodiment of the invention where, instead of depending on only the distances between the single pixel 102 in the first image 101 and the block of corresponding pixels 106 in the second image 105, I extend the distance measure to be a block of absolute block differences, i.e., to block-matching. Here, I define the distance between a first image block 302 centered on the pixel 102 and the block of corresponding pixels 106 at multiple positions 305 in a block search space 306 as $$d(I(x, y), I_w(x, y)) = \sum_{m=-\delta}^{\delta} \sum_{n=-\delta}^{-\delta} |I(x+m, y+n) - I_w(x+m, y+n)|,$$

where d is a block radius in the first image. Here, each matrix associated with the pixel 102 on the scan line 103 represents distances between the first image block 302, and the block of corresponding pixels 106 at multiple locations 305 within the search space 306. The blocks 305 are scanned, in a left-to-right, and top-to-bottom order, one pixel at the time within the search space 306.

For each scan line 103 and each pixel 102, I obtain a $[x_{max}-x_{min}, y_{max}-y_{min}]$ non-negative matrix according to boundary conditions described below. Then, a scan-line search space $S_y(x, i, j)$ is constructed by ordering the distance matrices 111 according to the order of the pixels in the scan line:

$$S_y(x, i, j) = d(I(x, y), I_w(x+i, y+j)),$$

where $(x_{min} \leq i \leq x_{max}, y_{min} \leq j \leq y_{max})$. Note that, the $I=0, j=0$ axis in the search space corresponds to zero-warping, i.e., no change in the pixel locations.

Boundary Conditions

The warping function can be subject to boundary conditions. The boundary conditions of the warping function are given as

| | |
|---|---|
| $w_x(x, y) = 0$ | $x = 1, x = M,$ |
| $w_y(x, y) = 0$ | $y = 1, y = N,$ |
| $w_x(x, y) \geq \max(0, x_{max})$ | $x < M/2,$ |
| $w_y(x, y) \geq \max(0, y_{max})$ | $y < N/2,$ |
| $w_x(x, y) \leq \max(M - x, x_{min})$ | $x > M/2,$ |
| $w_y(x, y) \leq \max(N - y, y_{min})$ | $y > N/2,$ | where $X_{min}, X_{max}$ and $y_{min}, y_{max}$ are a range of horizontal and vertical coordinates which determine an area of the first image 101.

Figure 4:
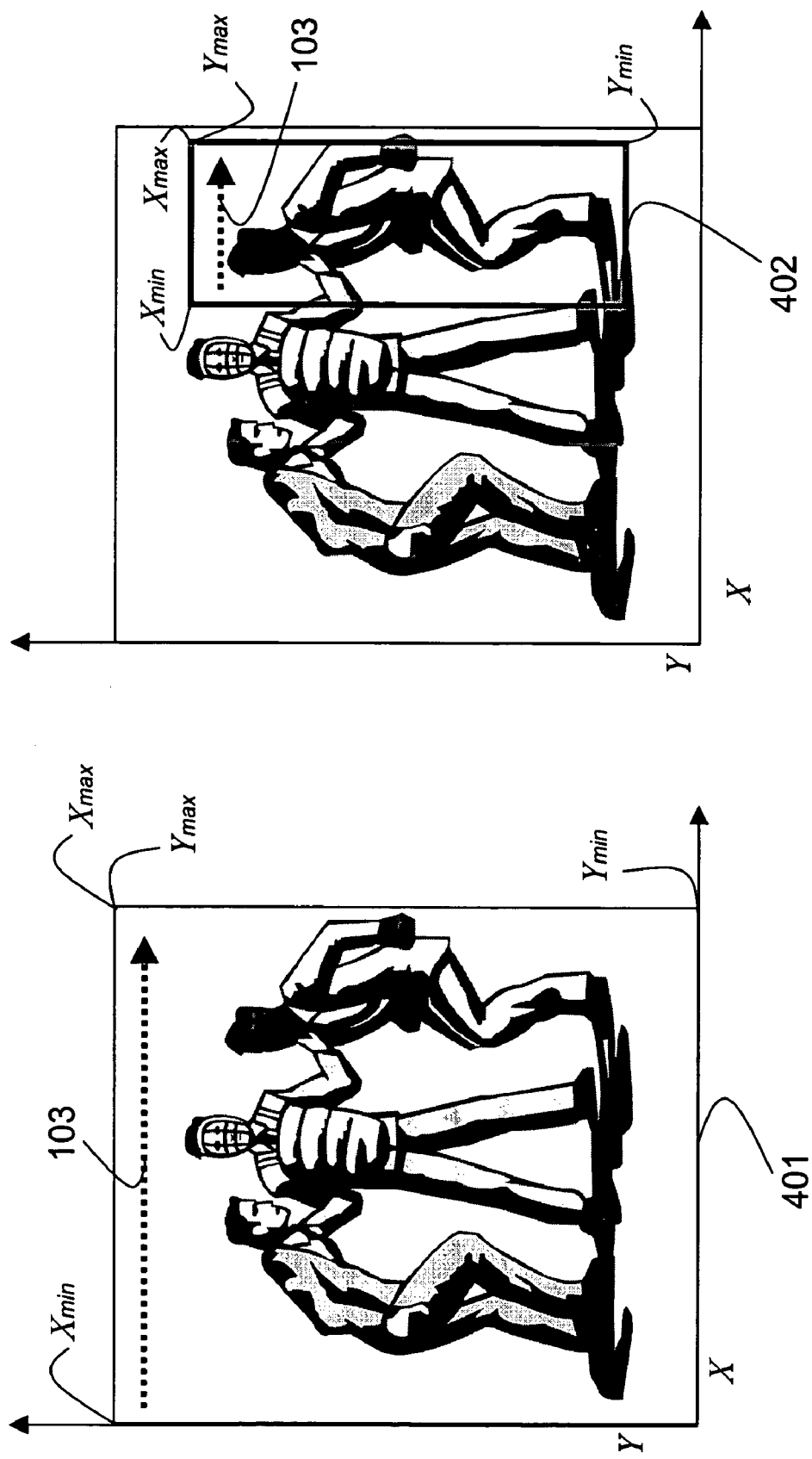
FIG. 4 is a block diagram of image boundary conditions.

As shown in FIG. 4, the boundary condition can include an entire first image 401, or a portion 402 of the first image. When the invention operates on the portion 402 of the first image, the scan-lines 103 are within the portion, and only distances between pixels on the scan lines within the portion are used.

The above boundary conditions impose that $$S_y(1,0,0) = S_y(M, 0,0) = 0.$$

One distinct advantage of using boundary conditions and a scan line search space is that the integration of a continuity constraint, and other constraints is simplified.

The scan-line search space expresses all possible warpings of pixels along the scan-line. If there is no continuity requirement, then the problem converts to ordinary block-matching, which finds the minimum at each distance matrix.

Continuity Constraint

The continuity constraint ensures that the ordering of the pixels before and after the warping is the same. In other words, if a pixel at coordinate x is mapped to coordinate x*, then the consecutive pixel along the scan-line at (x +1) can be mapped to pixels at the same coordinate (x) or following pixels (>x*) but not the pixel at coordinate (x*−1) or any preceding pixel. Otherwise, the ordering of pixels reverses, and path crossover occurs.

Therefore, the warping at (x+1) can only be greater than −1 in either the vertical or horizontal directions, i.e., $$w_x(x+1, y) \geq w_x(x, y) - 1 \text{ and } w_y(x+1, y) \geq w_y(x, y) - 1$$

in the scan-line direction within the search space.

I use this property to find the non-linear warping function according to the invention.

Determination of Minimum Cost Path

After constructing the scan-line search space, i.e., the ordered distance matrices 111, I determine 120 the minimum cost path 121 that connects the first (x=0) and last (x=M) pixels such that the total distance on the traversed path is the minimum among all possible paths and a transition between the warping from one pixel to next pixel is bounded by the above constraint.

My objective is to find a single minimum cost path traversing from (1, 0, 0) to (M, 0, 0) within a scan line $S_y$ by making controlled offsets. Therefore, I apply a dynamic programming technique, see, Porikli, "Sensitivity characteristics of cross-correlation distance metric and model function," Proceedings of 37th CISS, 2003.

Dynamic programming solves a multi-variable problem by solving a series of single variable problems. The essence of dynamic programming is Richard Bellman's Principle of Optimality. The principle is intuitive: from any point on an optimal trajectory, the remaining trajectory is optimal for the corresponding problem initiated at that point.

An edge e between two vertices v of a directed weighted graph has a cost c(e). The minimum cost path is determined by moving from an origin vertex $v_1$ to a destination vertex $v_M$, where the cost of a path $p(v_1, v_M) = \{v_1, \ldots, v_M\}$ is a sum of the constituent edges $$C(p(v_1, v_M)) = \sum_x^M c(v_x).$$

The costs $C(v_1, v^*)$ from the vertex $v_1$ to every other vertex are known. If v* is a last vertex on a path, before a vertex $v_M$, then the overall path is formed by concatenating edges from vertex $v_1$ to vertex v*, i.e., $p(v_1, v^*)$, with the edge $e(v^*, v_M)$. Furthermore, the path $p(v_1, v^*)$ is a minimum cost path because otherwise concatenating the minimum cost path with edge $e(v^*, v_M)$ decreases the cost of the overall path.

All edges have non-negative costs when the costs $C(v_1, v^*)$ are equal or less than the costs $C(v_1, v_S)$, because the cost $C(v_1, v_M) = C(v_1, v^*) + c(v^*, v_M)$. Thus, knowing the costs, I can find the minimum cost path.

I modify the well known Dijkstra algorithm for this purpose, Dijkstra, "A note on two problems in connection with graphs," Numerical Mathematics, (1): pp, 269-271, 1959. If Q is a set of active vertices, whose minimum cost paths from $v_1$ have been determined, and $\vec{p}(v)$ is a back pointer vector that indicates a neighboring minimum cost vertex of v, then an iterative procedure is given as 1. Set $u_1 = v_1$, $Q = \{u_1\}$, $C(u_1) = 0$, $\vec{p}(v_1) = v_1$, $c(v) = \infty$ for $v \neq u_1$.
2. Find $u_i$ that has the minimum cost $c(u_i)$.
3. For each $u_i \epsilon Q$: if v is a connected to $u_i$, then assign $c(v) \leftarrow \min\{c(u_i), C(u_i) + c(v)\}$.
4. If c(v) is changed, then assign $\vec{p}(v) = u_i$ and update $Q \leftarrow Q \cup v$.
5. Remove $u_i$ from Q. If $Q \neq \phi$, go to step 2.

The minimum cost path $p(v_1, v_M) = \{v_1, \ldots, v_M\}$ is obtained by tracing back pointers starting from the destination vertex $v_M$ as $v_{M-1} = \vec{p}(v_1)$.

In one embodiment, I convert the ordered matrices to directed weighted graph as follows. Each pixel (x, i, j) 102 in scan-line $S_y$ 103 corresponds to a vertex, $v_{x,i,j} = (x, i, j)$. The edges connect the pixel (x, i, j) to other pixels in the next distance matrix in the order. Using the continuity constraint, I can limit the directional edges to the vertices in the $8^{th}$-neighborhood. Thus, in this embodiment, there are nine possible edges, including the zero-warp case, which connect $v_{x, i, j}$ to $v_{x+1, i, j}, v_{x+1, i+1, j}, v_{x+1, i-1, j}, v_{x+1, i,j+1}, v_{x+1, i,j-1}, v_{x+1, i-1,j+1}, v_{x+1, i+1,j-1}, v_{x+1, i-1,j-1},$ and $v_{x+1, i+1,j+1}$.

The minimum cost path gives the 2-D warping of a 1-D line in the first image. To find the correspondences of the other scan-lines in the first image, I process the consecutive scan-lines iteratively.

The warping function can also be determined for more than one scan-line direction. For example, after all the horizontal scan-lines of an image are processed according to my method, the method can be repeated for vertical scan-lines and the pixel-wise mean of both functions is the warping function.

This invention is described using specific terms and examples. It is to be understood that various other adaptations and modifications may be made within the spirit and scope of the invention. Therefore, it is the object of the appended claims to cover all such variations and modifications as come within the true spirit and scope of the invention.

I claim:

1. A method for recovering a warping function between a first image and a second image, comprising:

constructing, for each pixel in a scan-line of a first image, a distance matrix representing distances between the pixel and a plurality of corresponding pixels of a second image, the distance matrices produced in an order of the scan-line;

converting the distance matrices to a directed weighted graph, in which each pixel in a scan-line of the first image corresponds to a vertex of the directed weighted graph and edges connect the vertices; and determining a minimum cost path through the ordered distance matrices, the minimum cost path representing a warping function between the first image and the second image, wherein the minimum cost path is determined by moving from an origin vertex v1 to a destination vertex vM, where the cost C of a path p(v1,vM)={v1, ..., vM} is a sum of the cost c of the edges $$C(p(v_1, v_M)) = \sum_{x}^{M} c(v_x),$$

where v* is a last vertex in the path before the destination vertex vM. (original), and in which the moving from an original vertex to a destination vertex is constrained such that if a pixel at coordinate x is mapped to coordinate x*, then the consecutive pixel along the scan-line at (x+1) can be mapped to pixels at the same coordinate (x) or following pixels (>x*), but not a pixel at coordinate (x*−1) or any preceding pixel.

2. The method of claim 1, in which the first image includes a plurality of scan lines, and a distance matrix is constructed for each pixel in each scan-line of the first image.

3. The method of claim 2, in which each scan-line includes a horizontal row of pixels of the first image.

4. The method of claim 2, in which each scan-line includes a vertical row of pixels of the first image.

5. The method of claim 2, in which each scan-line includes a diagonal row of pixels of the first image.

6. The method of claim 2, in which the scan-line includes a curved row of pixels of the first image.

7. The method of claim 1, in which the scan-line has a first direction.

8. The method of claim 7, in which the scan-line order is determined by the first direction.

9. The method of claim 1 in which a length of the scan line is determined by a boundary condition.

10. The method of claim 2, in which a number of scan lines is determined by a boundary condition.

11. The method of claim 1, in which the corresponding pixels are a block of corresponding pixels centered on a corresponding pixel in the second image having the same coordinates of the pixel of the first image.

12. The method of claim 1, in which the associated distance matrix represents distances between a block of pixels of the first image and a plurality of blocks of the corresponding pixels of the second image.

13. The method of claim 1, in which the distance matrices are non-negative.

14. The method of claim 1, further comprising:

mapping pixels of the first image to an output image according to the warping function and a continuity constraint.

15. The method of claim 14, in which an order of output pixels of the output image corresponds to the scan-line order of the pixels in the first image.

16. The method of claim 1, in which the cost of each edge in the minimum cost path is non-negative.

17. The method of claim 7, further comprising:

constructing, for each pixel in a scan-line having the second direction, a distance matrix representing distances between the pixel and a plurality of corresponding pixels of a second image, the distance matrices produced in an order of the scan-line having the second direction; and determining a next minimum cost path through the ordered distance matrices, wherein a mean of the minimum cost path and the next minimum cost path represents the warping function between the first image and the second image.

* * * * *